United States Patent [19]
Metzler et al.

[11] 4,082,291
[45] Apr. 4, 1978

[54] PICK-UP ARM ASSEMBLIES FOR RECORD PLAYERS

[75] Inventors: Gerhart Metzler, Offenburg; Peter Rother, Lahr; Hans Sukopp, Orsenhausen, all of Germany

[73] Assignee: Geratewerk Lahr GmbH, Lahr, Germany

[21] Appl. No.: 730,582

[22] Filed: Oct. 7, 1976

[30] Foreign Application Priority Data

Oct. 8, 1975 Germany ............................ 2545159

[51] Int. Cl.² .............................................. G11B 3/10
[52] U.S. Cl. .................................................... 274/23 R
[58] Field of Search ...................... 274/1 R, 23, 24, 37

[56] References Cited
U.S. PATENT DOCUMENTS

| | | | |
|---|---|---|---|
| 1,846,871 | 2/1932 | Hutter | 274/23 R |
| 2,532,803 | 12/1950 | Fans | 274/23 R |
| 3,227,459 | 1/1966 | Haines | 274/23 R |
| 3,228,699 | 1/1966 | Rost | 274/23 R |

FOREIGN PATENT DOCUMENTS 918,081  2/1963  United Kingdom .................. 274/23

Primary Examiner—Richard E. Aegerter
Assistant Examiner—John W. Shepperd
Attorney, Agent, or Firm—Fleit & Jacobson

[57] ABSTRACT

A pick-up arm assembly for a record player comprises a pick-up arm mounting, a counterbalance device which includes a counterweight and which is mounted to the pick-up arm mounting so as to be pivotable about vertical and horizontal axes, and a pick-up arm comprising a tube having sound pick-up means disposed at one end and an insert fitting means disposed at the other end. The insert fitting means is capable of being received by the counterbalance device to enable the pick-up arm to be removably fitted to the counterbalance device. The counterweight is mounted in the counterbalance device so that it is substantially horizontally displaceable with respect to the horizontal pivot axis, and adjusting means is arranged at the end of the pick-up arm remote from the sound pick-up means to enable substantially horizontal displacement of the counterweight to be effected when the insert fitting means is fitted to the counterbalance device.

14 Claims, 5 Drawing Figures

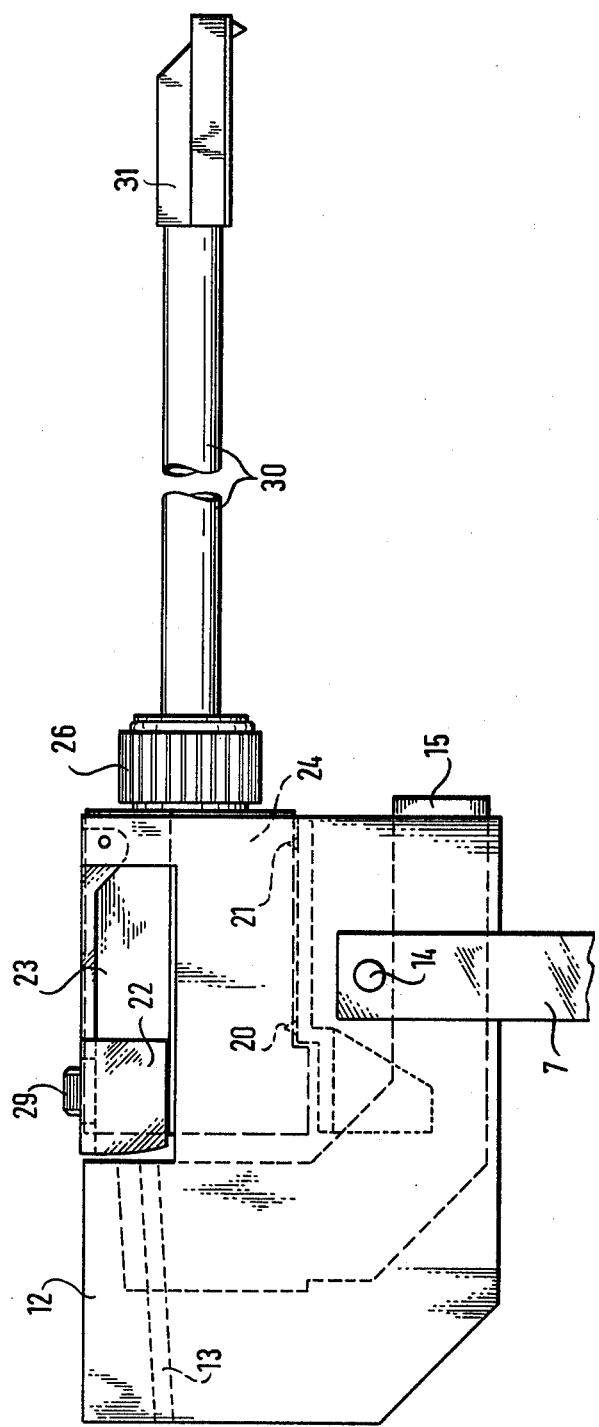

PICK-UP ARM ASSEMBLIES FOR RECORD PLAYERS

BACKGROUND OF THE INVENTION

1. Field of the invention

This invention relates to pick-up arm assemblies for record players.

2. Discussion of the prior art

U.S. Pat. No. 2,643,887 describes a pick-up arm assembly for a record player, the assembly comprising a counterbalance device which includes a counterweight and which is horizontally and vertically pivotally mounted in a pick-up arm mounting, and a pick-up arm comprising a tube having a sound pick-up means disposed at one end thereof. The pick-up arm can only be removed from the pick-up arm mounting in combination with the counterweight. The point of separation on removal, which also forms the horizontal pivotal axis, is a knife edge mounting. If a plurality of sound pick-up systems are to be used one after the other, either they must be respectively mounted on the pick-up arm tube and adjusted, or a plurality of pick-up arms must be provided, each of which is provided with a desired sound pick-up means. For this purpose, however, each pick-up arm must be provided with a precision member, as is required for a knife edge mounting. In addition, the electrical connections must be re-made on each occasion.

In addition, there are known linear pick-up arm arrangements with removable pick-up arm members, in which the balance or the contact force must be re-adjusted on each occasion whenever a change is made in the sound pick-up system or the sound pick-up means.

There are also pick-up arms in which the sound pick-up means is fixed on the pick-up arm. If the sound pick-up means can be removed or replaced at all, this can only be done by means of expensive tools, and requires a considerable amount of time. In addition, a separate sound head can be provided at the front end of the pick-up arm, the sound pick-up means being disposed in the head. This construction affords the possibility of selectively using a plurality of sound pick-up means, by fitting different heads, and in fact it is possible for the sound pick-up means to be changed relatively quickly. However, at each change of the head, the balance for the pick-up arm or the contact force must be re-adjusted. In addition, due to the plug-in connection for the sound head, there is an additional weight at the front end of the pick-up arm tube, and this adds a considerable amount to the moment of inertia of the pick-up arm, which is undesirable since pick-up arms of high quality are required to have the lowest possible moment of inertia.

SUMMARY OF THE INVENTION

It is therefore an object of the invention to provide a pick-up arm assembly which, while avoiding the disadvantages of the known constructions set forth above, enjoys low inertia and permits exchanging of the sound pick-up system or the sound pick-up means by the user without auxiliary aids, and wherein balancing and mechanical alignment, which is associated with the sound pick-up means, and/or the contact force, can be preprogrammed and can remain set so as to be readily precisely reproducible when an exchange is effected.

According to the invention, this object is achieved in that the counterbalance device is mounted pivotally about horizontal and vertical axes and is arranged to removably receive an insert fitting means disposed at the end of the pick-up arm tube which is remote from the pick-up means.

Advantageously, the insert fitting means of the pick-up arm tube end, which can be inserted into the counterbalance device, is provided with an adjusting means which engages the counterweight upon insertion, for displacing the counterweight with respect to the horizontal pivotal axis. This feature provides that, simply by inserting the pick-up arm tube into the counterbalance device, the balance for the pick-up arm and/or the contact force for the sound pick-up means, which is disposed on the inserted pick-up arm tube, is set.

After fitting the pick-up arm tube into the counterbalance device, for the purposes of compensating for differences between different sound pick-up means, there is provided the possibility of alignment in the longitudinal direction and within a given angular range about the longitudinal axis of the pick-up arm tube, by virtue of the fact that the pick-up arm tube, at the end remote from the pick-up means, is mounted in the insert fitting means so as to be movable in the axial and radial directions. For this purpose, the pick-up arm tube can be held in the insert fitting means by a releaseable clamp means.

The adjustment means arranged at the end of the pick-up arm end can comprise an adjusting screw which is displaceable by means of an adjusting wheel that can be actuated manually, and which can come to lie against an adjusting element of the counterweight. The balance and/or the contact force of the pick-up means can be adjusted precisely by rotating the adjusting screw. By means of the adjusting element in the counterweight, which can advantageously be in the form of an adjusting screw which is manually actuable, it is also possible to provide that a plurality of record players can be used with different pick-up arms interchanged as desired, whereby the balance and/or the contact force which had been previously adjusted on the pick-up arms are retained so that they can be reproduced.

In order to ensure that the pick-up arm can be balanced and in addition to ensure that the contact force is only slightly dependent on the inclination of the pick-up arm, the counterweight is so mounted in the counterbalance device that when the pick-up arm tube is inserted, with the sound pick-up means, the common center of gravity lies in each case at a constant distance below the horizontal pivotal axis, which distance is small. For this purpose the counterbalance device can have housing members which are provided with guide rails to guide the counterweights, which guide rails extend at an angle downwardly away from the horizontal pivotal axis.

In order to ensure secure positioning of the inserted pick-up arm tube in the counterbalance device even during operation, the counterbalance device can be provided with a clamp means for the insert fitting means of the pick-up arm tube. Positioning of the insert fitting means in the counterbalance device is ensured for example by raised portions and corresponding recesses, provided in abutting contact surfaces.

The moment of inertia due to the pick-up arm can be reduced to a minimum if the counterweight is arranged in the direct vicinity of the horizontal and the vertical pivotal axes of the pick-up arm mounting. The horizontal pivotal axis is advantageously defined by a generally U-shaped bracket which is secured with respect to the vertical axis. This provides for precise association of the horizontal pivotal axis with respect to the vertical pivotal axis.

The advantages of the invention are to be considered in particular as the following:

It is easy to exchange the pick-up arms with the sound pick-up means secured therein. When this is done, once the pick-up arm has been adjusted, the mechanical alignment, balance and/or contact force of the pick-up means are reproducibly retained. No special aids are required by the user for this purpose. In addition, the invention provides a pick-up arm with a low inertia. Furthermore, when fitting the pick-up arm into the counterbalance device the necessary electrical connections are made automatically, that is to say, exchanging different sound pick-up means or systems does not cause any difficulties. The pick-up arm also affords advantages from the production point of view, as only a small number of precision components are required. The pick-up arm mounting, the counterbalance device and the pick-up arm tube with the insert fitting means can be mounted and adjusted as well as tested separately. In addition, the pick-up arm in combination with automatic accessories in the pick-up arm mounting can be fitted as an operational pick-up arm unit into a record player.

BRIEF DESCRIPTION OF THE DRAWINGS

The invention will now be described in greater detail, by way of example, with reference to the accompanying drawings, in which:

FIG. 5 is a side view of the pick-up arm and insert fitting means mounted within the counterbalance device.

DETAILED DESCRIPTION OF THE PREFERRED EMBODIMENT

Figure 1:
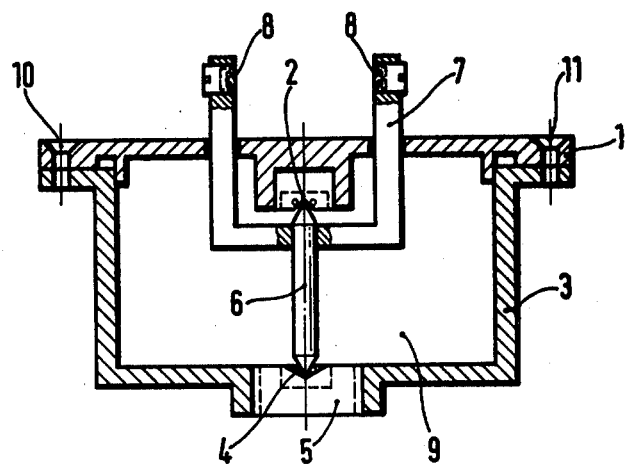
FIG. 1 is a view in partial cross-section of a pick-up arm mounting of a pick-up arm assembly embodying the invention.

The pick-up arm mounting shown in FIG. 1 includes a base plate 1 which carries an upper vertical mounting 2 and a housing member 3 into which a lower vertical mounting 4 is fitted by means of an adjusting screw 5. The pick-up arm mounting also includes a vertical spindle 6 supported in the mountings 2 and 4 for rotation about its axis. A generally U-shaped bracket 7 is secured to the spindle 6 and carries horizontal mountings 8. A shaft 14 (not shown in FIG. 1) of a counterbalance device described hereinbelow with reference to FIG. 2 is mounted horizontally in the mountings 8 so that the counterbalance device is pivotable about the vertical axis of the spindle 6 and the horizontal axis of the shaft 14.

The vertical spindle 6 serves as a high-precision reference member, with which are associated other structural elements (not shown in FIG. 1), which can be for example automatic accessories of an associated automatic record player. A space 9 is provided in the housing member 3 for these structural elements. Bores 10 and 11 provide for mounting the pick-up arm mounting on a record player.

Figure 2:
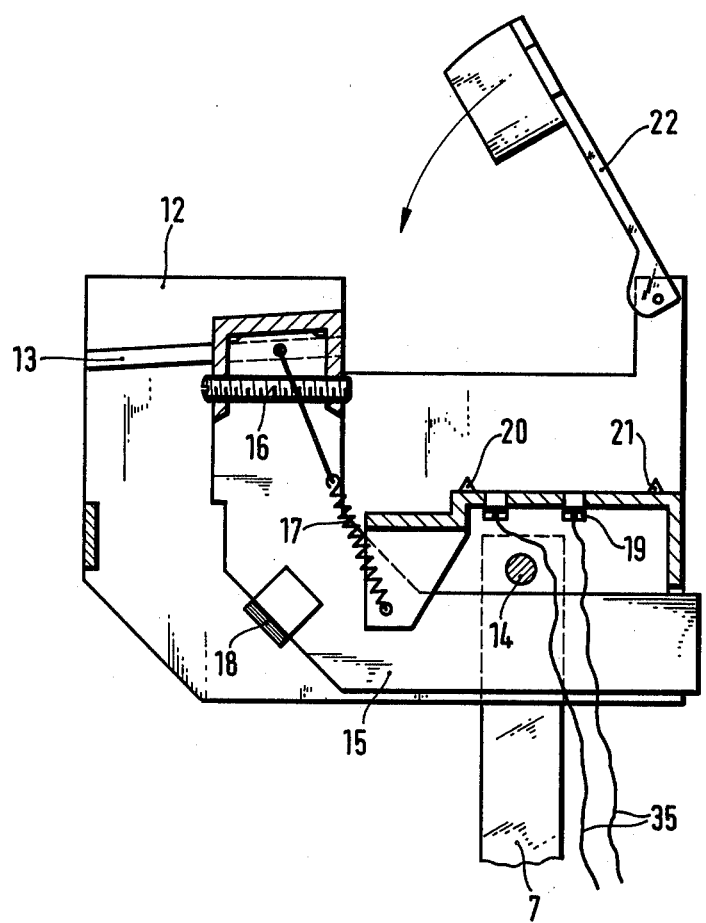
FIG. 2 is a view in longitudinal section of a counterbalance device of the pick-up arm assembly.
Figure 3:
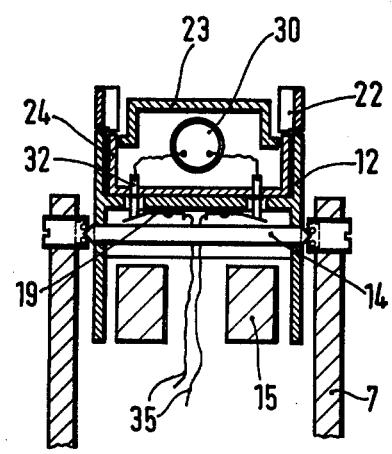
FIG. 3 shows the counterbalance device of FIG. 2 with an insert fitting means inserted therein, the view being taken in section perpendicular to the longitudinal direction.

The above-mentioned counterbalance device is shown in FIGS. 2 and 3 and is mounted to the pick-up arm mounting shown in FIG. 1 by means of the horizontal shaft 14 fitted in the horizontal mountings 8 of the bracket 7. The counterbalance device includes a housing member 12 provided with guide rails 13 which guide a counterweight 15 for movement within the member 12. The counterweight 15 is provided with an adjusting screw 16; and with a spacer member 18. The counterweight 15 is engaged by a guide spring 17 which is secured to the member 12 and which pulls the counterweight towards the horizontal axis of the spindle 6. A base part of the housing member 12 is provided with electrical spring contacts 19 to which are connected connection leads 35. Raised portions 20 and 21 are disposed on the base part of the housing member 12 for positioning an insert fitting means (which will be described in detail with reference to FIG. 4) upon insertion thereof. The counterbalance device also comprises a clamp lever 22 which is provided with a cam actuating means.

Figure 4:
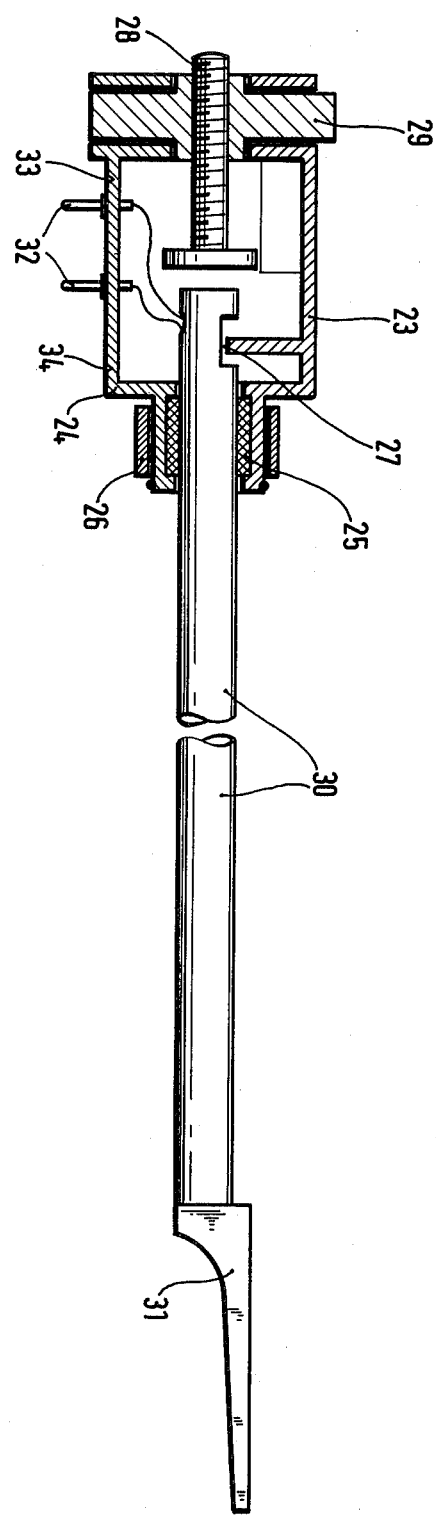
FIG. 4 is a view in longitudinal section of a pick-up arm of the assembly embodying the invention, the view showing a pick-up arm tube with the insert fitting means fitted thereto.

FIG. 3 shows the counterbalance device shown in FIG. 2 in transverse cross-section, with the inserted insert fitting means which is disposed at one end of a pick-up arm tube 30 shown in FIG. 4.

FIG. 4 is a view in longitudinal section of the pick-up arm tube 30 with the insert fitting means. The fitting means substantially comprises an upper housing member 23; and a lower housing member 24 in which are provided recesses 33 and 34. The recesses 33 and 34 correspond to the raised portions 20 and 21 on the housing member 12 of the counterbalance device. The raised portions 20 and 21 and the recesses 33 and 34 are provided for positioning the insert fitting means in the counterbalance device. The insert fitting means is provided with a resilient sleeve 25 into which one end of the tube 30 can be inserted. Disposed around the sleeve 25 is a clamp means 26 in the form of a ring, by means of which the tube 30 can be fixed in the insert fitting means. The inserted end of the pick-up arm tube is provided with a recess into which there projects a limit member 27 which is secured to the upper housing member 23.

The insert fitting means is also provided with an adjusting means which substantially comprises an adjusting screw 28 and a manually operable adjusting wheel 29.

Electrical contact pins 32 are provided on the lower housing member 24. The contact pins 32 are electrically connected to a sound pick-up means (not shown) which is to be disposed in a mounting head 31 secured to the end of the pick-up arm tube 30 remote from that end of the tube at which the insert fitting means is disposed.

The components shown in drawings co-operate as follows:

When the lever 22 of the counterbalance device is opened, the insert fitting means can be inserted with the tube 30 into the housing member 12 of the counterbalance device. A suitable sound pick-up means is disposed in the head 31. The insert fitting means is positioned and secured in the counterbalance device by pressing the lever 22 down, and this is achieved by the raised portions 20 and 21 in conjunction with the recesses 33 and 34. In addition, the contact pins 32 on the lower housing member 24 come into electrically conducting communication with the spring contacts 19 of the counterbalance device and provide for automatic contact-making between the sound pick-up means and the electrical circuit of the record player.

The pick-up arm tube 30 with the sound pick-up means on the head 31 can be aligned in the longitudinal direction and angularly about the longitudinal axis by releasing the clamp means 26. A given range of alignment can be predetermined by the limit member 27.

The adjusting screw 28 comes into engagement with the adjusting screw 16 as soon as the insert fitting means is pushed or inserted into the counterbalance device, so that the counterweight 15 is possibly pushed a short distance away from the horizontal shaft 14 at that time. Balance of the pick-up arm can be satisfactorily achieved by rotating the wheel 29. When this is done, the counterweight 15 moves against the force of the spring 17 on the obliquely downwardly inclined guide rails 13. The inclination of the guide rails provides that, independently of the weight of the sound pick-up means and thus the necessary position of the counterweight, the spacing of the common centre of gravity of all portions which are pivotable about the horizontal axis of the shaft 14 lie at a substantially constant and small distance below the horizontal axis of the shaft 14. This ensures, on the one hand, that the pick-up arm can be balanced and, on the other hand, also provides that the contact force is only slightly dependent on the inclination of the pick-up arm.

After a condition of balance has been achieved, the desired contact force can be set by rotation of the wheel 29 and resulting displacement of the counterweight towards the horizontal shaft 14.

If the pick-up arm is thereafter removed from the counterbalance device, after releasing the clamp lever 22, and replaced for example by another pick-up arm, the selected adjustment is retained by virtue of the position of the screw 28 and the wheel 29. That is to say, when the pick-up arm is re-fitted there is no need to carry out fresh adjustment of the pick-up arm balance and contact force. Due to the positioning action of the raised portions 20 and 21 and the recesses 33 and 34, there is provided a precisely defined position when the insert fitting means is re-fitted, so that fresh mechanical alignment of the pick-up arm is unnecessary.

This provides the advantage that pick-up arms can be provided with any desired sound pick-up systems or devices and the associated adjustments of the sound pick-up arm can be pre-programmed so that, whenever a respective pick-up arm is fitted into the counterbalance device, mechanical alignment of the pick-up arm, balance of the pick-up arm, and, in this preferred embodiment, also the contact force, are automatically achieved in the desired manner.

The adjusting screw 16 in the counterweight 15 also makes it possible to use different counterbalance devices. This means that different record players can be used freely interchangeably with any desired pick-up arms, the pick-up arms being automatically aligned upon fitting of the pick-up arm tubes provided with the insert fitting means, in combination with the appropriate sound pick-up systems. The adjusting screw 16 in the counterweight 15 does in fact permit compensation for or correction of tolerances which occur in different counterbalance devices.

This can be effected for example in the following manner: balance of the pick-up arm is achieved, in a given counterbalance device, with a pick-up arm tube with a sound pick-up system and insert fitting means. Subsequently, balance is achieved on all other counterbalance devices provided, also by means of the same pick-up arm, by using the respective adjusting screw 16, but without actuating the adjusting wheel 29. This means that any differences in the individual counterbalance device relative to each other are compensated for so that it is possible freely to interchange pick-up arms which are pre-programmed by means of the adjusting means in the insert fitting means.

As all the components which are of a weight worth consideration, that is to say, in particular the counterweights, can be arranged in the vicinity of the vertical and horizontal pivotal axis of the counterbalance device defined by the axes of the spindle 6 and shaft 14, such components make only a slight contribution to the overall moment of inertia of the pick-up arm. The resulting moment of inertia of the pick-up arm is determined primarily only by the sound pick-up system used and secondarily by the moment of inertia of the mouting head and the pick-up arm tube. The other components contribute only a small fraction of the overall moment of inertia.

We claim:

1. A pick-up arm assembly for a record player, said assembly comprising:
   a pick-up arm comprising a pick-up arm tube, a sound pick-up mounting means disposed at one end of said tube, and an insert fitting means disposed at the other end of said tube;
   supporting means for supporting said pick-up arm including means for removably mounting said insert fitting means, said supporting means further comprising horizontal pivot means defining a horizontal axis and vertical pivot means defining a vertical axis;
   a pick-up arm counterweight supported by said supporting means and, said supporting means including means for shiftably mounting said counterweight in a plane substantially parallel with respect to said horizontal pivot means; and,
   adjusting means provided on said insert fitting means for horizontally shifting said counterweight into a position wherein said pick-up arm can be balanced within said supporting means.

2. The pick-up arm assembly of claim 1 wherein said tube is elongated and defines a longitudinal axis, and including means mounting said other end of said tube to said insert fitting means such that said tube is displaceable with respect to said insert fitting means along its longitudinal axis.

3. The pick-up arm assembly of claim 1 wherein said tube is elongated and defines a longitudinal axis, and including means mounting said other end of said tube to said insert fitting means such that said tube is rotatable about its longitudinal axis.

4. The pick-up arm assembly of claim 1 wherein said tube is elongated and defines a longitudinal axis, and including means mounting said other end of said tube to said insert fitting means such that said tube is both rotatable about its longitudinal axis and is displaceable with respect to said insert fitting means along its longitudinal axis.

5. The pick-up arm assembly of claim 4 wherein said means mounting said other end of said tube to said insert fitting means comprises a releasable clamp means.

6. The pick-up arm assembly of claim 1 wherein said adjusting means comprises a manually operable adjusting wheel and an adjusting screw which can be displaced by means of said manually operable adjusting wheel and bears against said counterweight.

7. The pick-up arm assembly of claim 1 wherein an adjustable screw is provided in said counterweight, said adjustable screw serving as an abutment for the said adjusting means.

8. The pick-up arm assembly of claim 1 wherein said counterweight is supported in said supporting means in such a way that when said pick-up arm is supported in said supporting means the common center of gravity of said pick-up arm and supporting means lies at a constant spacing below said horizontal pivot means.

9. The pick-up arm assembly of claim 8 wherein said counterweight is supported in said supporting means by guide rails provided on said supporting means for guiding said counterweight during the shifting of said counterweight, said guide rails being inclined with respect to said horizontal axis.

10. The pick-up arm assembly of claim 1 wherein said supporting means is provided with a clamp means for releasably mounting said insert fitting means.

11. The pick-up arm assembly of claim 1 wherein raised portions and corresponding recesses are provided on abutting contact surfaces of said insert fitting means and said supporting means for positioning the insert fitting means (23, 24) in said supporting means.

12. The pick-up arm assembly of claim 1 wherein a first electrical contact set, connected to said sound pick-up mounting means, is provided on said insert fitting means and a second electrical contact set is provided on said supporting means, said first and second contact sets being so arranged that when said insert fitting means is mounted on said supporting means, an electrical connection is established between said sound pick-up mounting means and said supporting means, wherein one of said contact sets comprise spring contacts.

13. The pick-up arm assembly of claim 1 including a spring which acts between said supporting means and said vertical axis and which is pre-stressed when said insert fitting means is fitted into said supporting means to provide a contact force for said sound pick-up mounting means.

14. A pick-up arm assembly as claimed in claim 1, wherein said vertical pivot means comprises a spindle rotatable along said vertical axis, and said horizontal pivot means comprises a shaft mounted along said horizontal axis.

* * * * *